April 10, 1945.                L. E. LA BRIE                2,373,122
                         HYDRODYNAMIC TRANSMISSION
                           Filed April 16, 1942
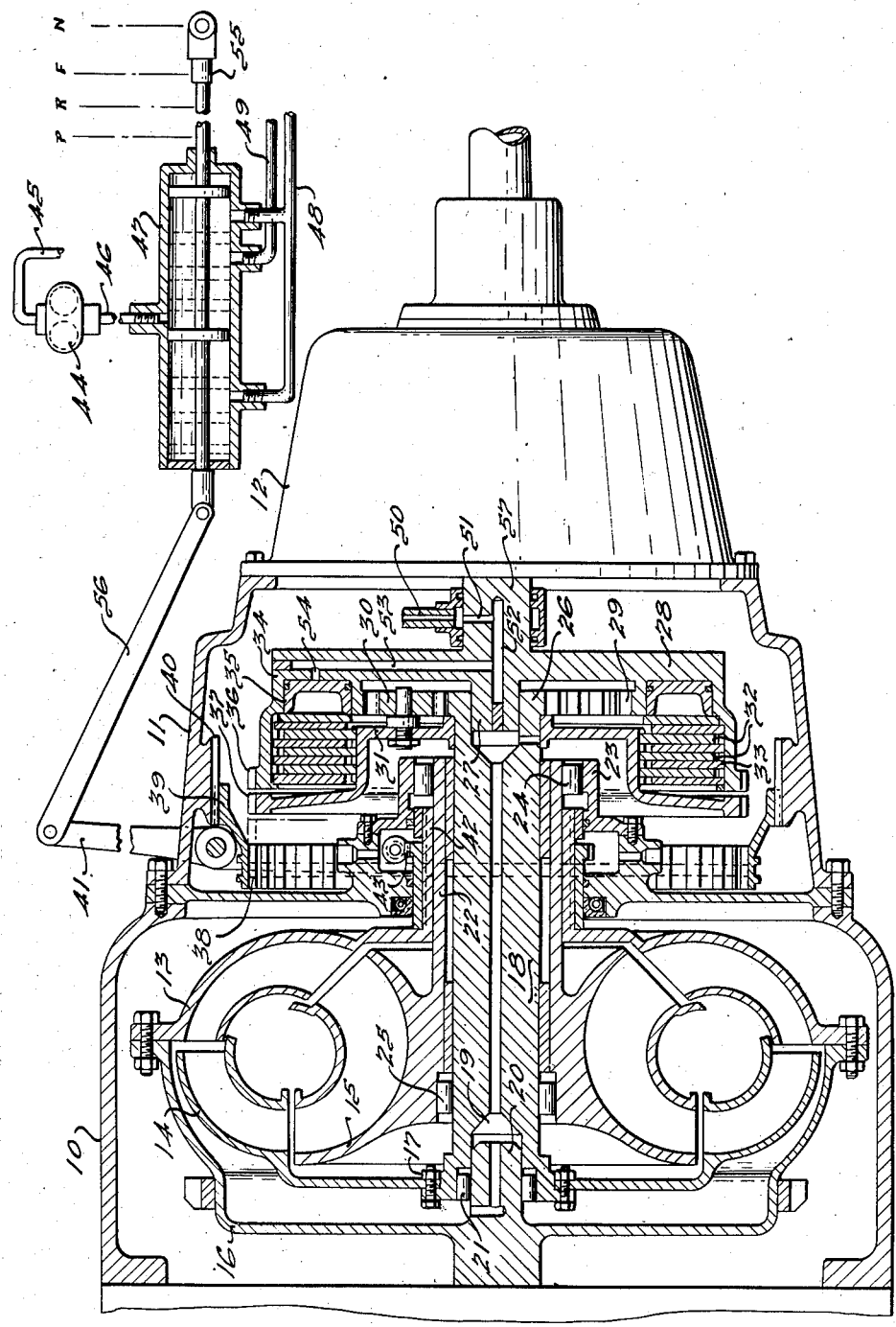
INVENTOR
*Ludger E. LaBrie.*
BY
*Harness, Dixd, Pattu & Harris*
ATTORNEYS.

Patented Apr. 10, 1945

2,373,122

UNITED STATES PATENT OFFICE 2,373,122

HYDRODYNAMIC TRANSMISSION

Ludger E. La Brie, Detroit, Mich., assignor to Chrysler Corporation, Highland Park, Mich., a corporation of Delaware Application April 16, 1942, Serial No. 439,184

13 Claims. (Cl. 74—189.5)

This invention relates to vehicle power transmissions and the main object is to provide a combined hydraulic and mechanical transmission which is automatic in operation, simple in design and which provides adequate speed ratio variation for satisfactory operation in conventional types of motor cars.

A further object is to provide in such a transmission means for locking the driven shaft against movement relatively to the casing thereby eliminating the necessity for the usual parking brake mechanism.

Other objects and advantages will be apparent from the following description taken in conjunction with the accompanying drawing, in which a preferred embodiment of the invention is illustrated.

In the drawing, the single figure shows a side elevation of my improved transmission, partly in section.

The transmission comprises a three section casing, the front portion 10 housing the hydraulic unit, the central portion 11 housing the reverse gearing and the rear portion 12 housing the overdrive unit.

The hydraulic unit includes a torque connector having an impeller 13 connected to the engine crankshaft by means of the housing 16, a runner or turbine 14 and a guide wheel 15. The runner is bolted at 17 to an intermediate driven shaft 18 and this latter shaft has a hollow portion 19 into which is piloted the rear end of a shaft 20 which forms part of the housing 16. An overrunning roller clutch 21 is operatively disposed between the shafts 18 and 20 for preventing overrun of the shaft 18.

The guide wheel 15 has a rearwardly extending sleeve 22 which has an overrunning brake connection with a brake member 23 carried by the casing. The overrunning brake includes rollers 24 which permit the guide wheel to rotate forwardly but prevent it from rotating in reverse direction.

An overrunning clutch 25 is operatively disposed between the guide wheel and the shaft 18 for clutching the guide wheel to the shaft in the forward direction of rotation and for permitting the shaft to overrun the guide wheel in this same direction.

The shaft 18 terminates rearwardly in a sun gear 26 which is hollow and pilots the hub 27 of an annulus 28. The latter has gear teeth 29 formed thereon, which teeth mesh with planet pinions 30 carried by a carrier 31. The pinions 30 also mesh with the sun gear 26.

The annulus 28 also carries a set of clutch plates 33 which are adapted to engage similar plates 32 carried by the carrier 31. A cylinder 34 formed in the annulus 28 carries a piston 35 which bears on the clutch plates and urges them into engagement when pressure fluid is admitted to the cylinder as will be presently explained.

The annulus 28 carries a set of external teeth 36 and the carrier is provided with a similar set of teeth 37. These teeth are adapted to be engaged by the teeth 38 of a slidable sleeve 39 which is mounted in the casing 11 for sliding on the spline teeth 40, a lever 41 being provided for shifting the sleeve.

The impeller 13 has a rearwardly extending sleeve portion 42 on which is splined a pump drive gear 43. This gear drives a pump shown diagrammatically at 44, the input 45 of which is connected to the interior of the casing 10.

The pump output conduit 46 is connected to a valve 47 which may be positioned on any suitable part of the vehicle. The valve 47 has a drain conduit 48 which leads back to the casing 10 and a pressure conduit 49 which is connected to a pipe 50, the latter communicating by means of passages 51, 52, 53 and 54 with the cylinder 34.

The valve 47 has an operating member 55 which is connected by a link 56 with the lever 41 such that the valve and sleeve 39 are actuated in unison by any type of suitable manually operated control.

The valve 47 has four positions as diagrammatically indicated on the drawing. In neutral position (as illustrated in full lines) the sleeve 39 is in extreme forward position and the pump 44 is exhausting in the drain pipe 48 through the valve 47. Under these conditions the carrier 31 and the annulus 28 are both free so no rotation is imparted to the driven shaft 57 which is shown as an integral part of the annulus, but which may be separate therefrom if desired.

Shift of the valve member 55 to forward position cuts off communication between the pump 44 and the drain passage 48 and causes pressure to build up in conduit 49 and cylinder 34 whereupon piston 35 is caused to move forwardly and engage the clutch plates 32, 33. This locks the annulus 28 to the carrier 31 thereby causing a 1 to 1 ratio drive to be transmitted from shaft 18 to shaft 57. The sleeve 39 is shifted rearwardly at the same time, but not far enough to engage either the teeth 36 or 37.

The vehicle may then be accelerated in forward speed, the guide wheel 15 of the torque connector being prevented from reverse rotation by the overrunning brake 24 thus furnishing reaction for the unit.

When the vehicle has attained sufficient speed such that the impeller and runner tend to rotate at substantially the same speed, the reaction forces on the vanes of the guide wheel 15 will disappear and the guide wheel will be urged forwardly by the impelled fluid. The brake 24 will then automatically disengage and the clutch 25 will automatically engage to lock the guide wheel to the shaft 18 whereupon it serves as an auxiliary runner.

The transmission is, under these conditions, operating in what is practically direct drive, the hydraulic unit functioning as a fluid coupling of the kinetic type.

Shift to a higher speed ratio in the overdrive mechanism is preferably accomplished by automatic speed responsive means. Inasmuch as the details of the overdrive mechanism are unimportant so far as the present invention is concerned, no description thereof will be given. An overdrive of the type described and shown in Webb patent, No. 2,236,657, granted April 1, 1941, or in the copending application of Neracher and Dunn, Serial No. 304,060, filed November 13, 1939, may be used.

Shift of the valve member 55 to reverse position vents the clutch control cylinder 34 and opens the pressure side of the pump 44 to the drain. At the same time the sleeve 39 is engaged with the teeth 37 of the carrier 31. The carrier is thus held against rotation whereupon a reverse drive will be transmitted from the shaft 18 to the shaft 57 through the planetary gearing.

Shift of the member 55 to park position will engage the sleeve 39 with teeth 37 and teeth 36 while still maintaining the clutch control cylinder vented. This results in the planetary gearing being locked up against rotation relatively to the casing, thus the shaft 57 is rendered non-rotatable, and the vehicle cannot coast or be driven.

It will thus be seen that I have provided an extremely simple and compact transmission which is economical to manufacture, automatic in operation and well adapted for use in light cars.

I claim:

1. In a power transmission, a casing; a driving shaft; a driven shaft; means including a planetary gearset connecting said shafts; slidable brake means independent of said gearset movable into engagement with one of the elements of said gearset to hold the same against rotation for transmitting a drive between said shafts, and movable into engagement with at least one additional element of said gearset while still engaged with said one element to hold said additional element of said gearset against rotation whereby both of said shafts are rendered non-rotatable means independent of said brake means operable to condition a pair of elements of said gearset to establish a drive between said shifts and control means operable to maintain said brake means disengaged during establishment of said drive by said conditioning means.

2. In a power transmission, a driving shaft; a sun gear carried by the driving shaft; a driven shaft; an annulus gear carried by the driven shaft; a planet carrier having pinions thereon disposed in mesh with said sun and annulus; a casing for said shafts and gears; a shiftable control member carried by said casing for engaging the carrier; means on said carrier adapted to be engaged by said member whereby a reverse driving relation is established between said shafts; and means on said annulus adapted to be engaged by the same member whereby the driven shaft is locked against rotation.

3. The combination set forth in claim 2 wherein the control member is adapted to engage the carrier and annulus simultaneously to thereby prevent rotation of both of said shafts.

4. In a power transmission, a driving shaft; a fluid impeller wheel carried by said driving shaft; a second shaft; a turbine wheel carried by said second shaft; a casing for said wheels and shafts; a guide wheel disposed in operative relationship to said impeller and turbine wheels; an overrunning brake connection between said guide wheel and the casing for preventing rotation of the guide wheel in the direction of its rotational tendency caused by reaction of the fluid set in motion by the impeller wheel; an overrunning clutch connection between the guide wheel and said second shaft for permitting said shaft to overrun the guide wheel in forward direction of rotation but preventing the guide wheel from overrunning the shaft in said forward direction; a driven shaft; planetary gearing drivingly disposed between said second shaft and said driven shaft; fluid operated clutch means carried by said gearing for clutching two of the elements thereof together thereby to establish direct drive between said shafts; means including a shiftable member carried by the casing for engaging one of the elements of said gearing thereby to establish reverse drive between said shafts.

5. In a power transmission, a driving shaft; a fluid impeller wheel carried by said driving shaft; a second shaft; a turbine wheel carried by said second shaft; a casing for said wheels and shafts; a guide wheel disposed in operative relationship to said impeller and turbine wheels; an overrunning brake connection between said guide wheel and the casing for preventing rotation of the guide wheel in the direction of its rotational tendency caused by reaction of the fluid set in motion by the impeller wheel; an overrunning clutch connection between the guide wheel and said second shaft for permitting said shaft to overrun the guide wheel in forward direction of rotation but preventing the guide wheel from overrunning the shaft in said forward direction; a driven shaft; planetary gearing drivingly disposed between said second shaft and said driven shaft; clutch means carried by said gearing for clutching two of the elements thereof together thereby to establish direct drive between said shafts; means including a shiftable member carried by the casing and adapted for shifting to engage one of the elements of said gearing thereby to establish reverse drive between said shafts and two of the elements of said gearing thereby to lock said shafts from rotation.

6. In a power transmission, a driving shaft; a fluid impeller wheel carried by said driving shaft; a second shaft; a turbine wheel carried by said second shaft; a casing for said wheels and shafts; a guide wheel disposed in operative relationship to said impeller and turbine wheels; an overrunning brake connection between said guide wheel and the casing for preventing rotation of the guide wheel in the direction of its rotational tendency caused by reaction of the fluid set in motion by the impeller wheel; an overrunning clutch connection between the guide wheel and said second shaft for permitting said shaft to overrun the guide wheel in forward direction of rotation but preventing the guide wheel from overrunning the shaft in said forward direction; a driven shaft; planetary gearing drivingly disposed between said second shaft and said driven shaft; clutch means carried by said gearing for clutching two of the elements thereof together thereby to establish direct drive between said shafts; means including a shiftable member carried by the casing and adapted for shifting to engage one of the elements of said gearing thereby to establish reverse drive between said shafts and two of the elements of said gearing thereby to lock said shafts from rotation; fluid pressure means for controlling said clutch; manually operable means for controlling said shiftable member, and interlocking control means for maintaining said clutch disengaged when said shiftable member is in an operative position.

7. In a power transmission, a driving shaft; a driven shaft; a sun gear carried by the driving shaft; an annulus gear carried by the driven shaft; a carrier having planet gears mounted thereon disposed in mesh with said sun and annulus gears; clutch plates carried by said carrier; clutch plates carried by said annulus gear and arranged in interleaved relation with the aforesaid plates; a fluid cylinder carried by the annulus gear; a piston in said cylinder and disposed in operative relation with said clutch plates; a pump driven by said driving shaft, valve means for controlling the admission of pressure fluid to said cylinder and means also under control of said valve means for simultaneously holding both said carrier and annulus from rotation.

8. In a power transmission, a driving shaft; a driven shaft; a sun gear carried by the driving shaft; an annulus gear carried by the driven shaft; a carrier having planet gears mounted thereon disposed in mesh with said sun and annulus gears; clutch plates carried by said carrier; clutch plates carried by said annulus gear and arranged in interleaved relation with the aforesaid plates; a fluid cylinder carried by the annulus gear; a piston in said cylinder and disposed in operative relation with said clutch plates; a pump driven by said driving shaft and valve means for controlling the admission of pressure fluid to said cylinder; brake means carried by a stationary part of the transmission for preventing rotation of said carrier and said annulus gear; and means interconnecting said brake means and said valve whereby said cylinder is vented whenever said brake means is engaged.

9. In a power transmission, a casing, a driving shaft, a driven shaft, means including a planetary gearset connecting said shafts, means for holding one of the elements of said gearset against rotation for transmitting a drive between said shafts, and means for simultaneously holding at least one additional element of the said planetary gearset against rotation whereby both of said shafts are rendered non-rotatable, said holding means comprising slidable tooth means on said casing and tooth means on said planetary elements engageable with said slidable tooth means.

10. In a power transmission, a planetary gearset including a plurality of rotatable elements, power operated means operable to connect two of said elements for unitary rotation, means for controlling operation of said power operated means, means operable to engage one or both of said two elements for preventing rotation thereof and means interconnecting said last mentioned means and said power control means for actuating said power operated means to disconnect said two elements when the said last mentioned means is operated to engage one or both of said two elements.

11. In a power transmission, a casing, a driving shaft, a driven shaft coaxial with the driving shaft, a planetary gearset for drivingly connecting said shafts including an input element, an output element and a third element all rotatable about the axis of said shafts, a set of clutch plates carried by said output element, a set of clutch plates carried by one of said other planetary elements, power operable means carried by said output element for effecting engagement of said clutch plates, a set of brake teeth carried by one of said clutch plate carrying elements, a brake sleeve rotatably fixed relative to said driven shaft and including teeth shiftable into engagement with said brake teeth, means for shifting said sleeve, means including a movable member for controlling said power operable means, and means interconnecting said shift means and movable control member and reciprocable thereby whereby said clutch plates are disengaged when said brake sleeve teeth are engaged with said brake teeth.

12. In a power transmission, a casing, a driving shaft, a driven shaft, a planetary gearset for drivingly connecting said shafts including an input sun gear, an output annulus gear, and a carrier, a brake sleeve slidably carried by said casing and rotatably fixed relative thereto, a set of brake teeth on said carrier, a set of brake teeth on said annulus and means for shifting said sleeve into and out of engagement with one or both sets of brake teeth.

13. In a power transmission for a vehicle having an engine, a driving shaft adapted to receive drive from the engine; a driven shaft adapted to drive the vehicle; a casing for said shafts; a planetary gearset for drivingly connecting said shafts including an input sun gear, an output annulus gear and a carrier; fluid pressure operated means operable to clutch the carrier to one of the aforesaid gears for direct drive, said fluid pressure operated means including an annular piston; means for controlling said fluid pressure operated means; manually operable brake means for connecting the carrier to the casing for establishing reverse drive; and a common control lever for said clutch and brake operable to actuate said control means for said fluid pressure operated means to cause disengagement of said carrier from said one gear when said brake means is operated to connect said carrier to said casing.

LUDGER E. LA BRIE.